United States Patent
Galbiati et al.

[11] Patent Number: 6,137,253
[45] Date of Patent: Oct. 24, 2000

[54] METHOD OF PWM DRIVING A BRUSHLESS MOTOR WITH DIGITALLY STORED VOLTAGE PROFILES WITH REDUCED LOSSES

[75] Inventors: Ezio Galbiati, Agnadello; Michele Boscolo, Sottomarina; Marco Viti, Sesto San Giovanni, all of Italy

[73] Assignee: STMicroelectronics S.r.l., Agrate Brianza, Italy

[21] Appl. No.: 09/256,278

[22] Filed: Feb. 23, 1999

[30] Foreign Application Priority Data

May 5, 1998 [EP] European Pat. Off. .............. 98830270

[51] Int. Cl.[7] ................................ H02P 7/00; H02P 6/08; H02P 6/14
[52] U.S. Cl. ................ 318/599; 318/138; 318/254; 318/439
[58] Field of Search ........................... 318/138, 245–283, 318/778, 439, 434, 798, 815, 808

[56] References Cited

U.S. PATENT DOCUMENTS

| | | | |
|---|---|---|---|
| 5,283,510 | 2/1994 | Tamaki et al. | 318/696 |
| 5,296,796 | 3/1994 | Clower | 318/808 |
| 5,589,746 | 12/1996 | Lewis | 318/439 |
| 5,793,180 | 8/1998 | Maiocchi et al. | 318/778 |

FOREIGN PATENT DOCUMENTS

| | | |
|---|---|---|
| 0 800 263 A1 | 3/1996 | European Pat. Off. . |
| 0 800 263 A1 | 10/1997 | European Pat. Off. . |
| 7-327393 | 12/1995 | Japan . |

OTHER PUBLICATIONS

Patent Abstracts of Japan, vol. 096, No. 004, Apr. 30, 1996 and JP 07 327393A (Sanyo Electric Co., Ltd.), Dec. 12, 1995.

*Primary Examiner*—Paul Ip
*Attorney, Agent, or Firm*—Theodore E. Galanthay; Allen, Dyer, Doppelt, Milbrath & Gilchrist, P.A.

[57] ABSTRACT

A method is for driving a multiphase brushless motor with N windings connected in a star or in a polygonal configuration. The windings are driven according to a certain periodic voltage profile. The method includes cyclically keeping for a certain time interval at least one of the N windings in a fixed state of low or high saturation and applying to the other phase windings instantaneous voltages according to a predefined different periodic voltage profile such that the resultant voltages on the windings are coherent with the certain periodic voltage profile. The number of intervals, in an entire electrical period, in which the fixed high or low saturation state of one winding is produced, depends on the predefined driving profile and upon the number N of windings of the motor.

20 Claims, 6 Drawing Sheets

METHOD OF PWM DRIVING A BRUSHLESS MOTOR WITH DIGITALLY STORED VOLTAGE PROFILES WITH REDUCED LOSSES

FIELD OF THE INVENTION

The present invention relates to techniques for driving motors, and, more particularly, to a technique and circuit for an electronically DC switched motor usually known as brushless motor.

BACKGROUND OF THE INVENTION

Usually a brushless motor is driven by appropriately exciting the motor's phase windings synchronously with the instantaneous position of the rotor. More precisely, this is done by sequentially exciting two of the motor's windings with positive and negative voltages respectively, leaving a third phase winding in a high impedance state. When driving a "sensorless" brushless motor, the non-excited phase winding is exploited for detecting the rotor's position.

According to a driving technique described and illustrated in European patent application No. 96830180.4, filed on Mar. 29, 1996, and assigned to the present assignee, on the motor's phase windings are sequentially applied or forced excitation voltages or currents. For these currents or voltages, rather than having a certain substantially constant level during each switching phase, have a certain profile (that is they have a non-constant value) which may be predefined, digitized and stored in a read only memory, such as, for instance, an EPROM or EEPROM.

The predefined cyclic or alternating profile may be sinusoidal or, more generally, the result of a Fourier sum of harmonics of a fundamental frequency. In practice, this innovative driving technique permits optimizing the torque characteristics of the motor by allowing for the predefinition of the most suitable cyclic waveform of the excitation voltage or current that is applied to or forced on the motor's phase windings. During each switching phase, the driving current or voltage does not correspond to a certain constant value as was common in more traditional driving systems. Instead it corresponds to a certain profile congruent with a portion of the whole predefined cyclic or alternate waveform. In other words, during each switching phase, the winding's driving signal level precisely follows a segment of the predefined waveform.

A second European patent application No. 96830190.3, filed on Apr. 4, 1996, also assigned to the present assignee, describes a highly efficient technique for synchronizing the sequence of excitation phases with respect to the actual rotor's position to optimize the torque characteristic of a driving system as that of the prior patent application No. 96830180.4. According to patent application No. 96830295.0, at each instant the three BJT or MOS half bridges, coupled to the respective motor's three phase windings, are driven in a PWM mode. Moreover, if the motor is connected in star configuration, with CT the star center and Vcc the supply voltage, then CT assumes a voltage equal to Vcc/2. Therefore, the maximum voltage swing that is available on each motor's winding is limited to ±Vcc/2. At the same time, the differential voltage swing (phase-phase) is limited to $$\pm \frac{Vcc}{2} * \sqrt{3}.$$

SUMMARY OF THE INVENTION

An object of the present invention is to provide a driving system and method for multiphase brushless motors that cyclically, during any of the switching phases, applies an appropriate voltage to a number of phase windings of the motor according to a PWM modulation scheme. This is done while keeping at least one phase winding in either a low or a high saturation state (that is with a duty cycle of 0% or 100% respectively).

In such a driving system, the PWM drive signal is applied only to a reduced number of windings at a time while at least one winding is kept in a stable saturation state. A direct consequence is that switching losses are reduced. This is so as compared to techniques where all the windings are simultaneously driven with a substantially non-zero voltage signal. Moreover, the driving system as a whole is simplified. In addition, this system allows an enhanced maximum voltage swing on the terminals of the windings.

According to the present invention, the most effective profile of the driving waveform to be applied cyclically to the terminals of the motor's windings for producing the required differential voltage on all the phase windings is determined. In fact, while there may be an infinite number of possible functions f(t) for the drive or line voltages (the signal applied between each terminal of the motor and ground) such as to produce a desired differential voltage (phase-to-phase), there is only one function that optimizes the performances in terms of dissipated power and voltage swing.

The computation will be described below for the case of a three-phase motor (N=3) but it is applicable also to any other multiphase motor. In such a sample case, the three voltages, each having its profile described by f(t), will have to be applied to the respective motor windings with a relative phase shift of 120°, thus defining three profiles $f_i(t)$, where i=1,2,3.

At any instant, there is always one of the three profiles $f_i(t)$, i=1,2,3, that presents a voltage, referred to ground, lower than the other two. A function p(t) may be defined such that at any instant it assumes the lowest one of the values of the $f_i(i)$ three functions. At that specific instant: $p(t)=\min \{f_1(t); f_2(t); f_3(t)\}$. The cyclical voltage profile, referred to ground potential, to be applied to each phase winding terminal is given by:

$$g_i(t)=f_i(t)-p(t) \qquad (i=1,2,3)$$

Similarly, it is possible to identify a function p'(t), such that $p'(t)=\max\{f_1(t); f_2(t); f_3(t)\}$, from which new profiles may be defined as: $g'_i(t): g'_i(t)=M-p'(t)+f_i(t)$, where M is the absolute maximum value of f(t) of the entire period. The profiles $g_i(t)$ and $g'_i(t)$, thus obtained are the profiles that, according to the present invention, must be applied to the two phase windings driven in that particular switching phase.

The ensuing description is for the case of a switching-mode driving system, for a three-phase star connected motor, where f(t) is sinusoidal [f(t)=sin(t)]. Moreover, for storing the digitized profiles, it will be assumed, by way of example, the use of 8-bit memory registers, notwithstanding the fact that the system may be easily expanded to other desired dimensions. In general, the present invention is applicable to any motor irrespective of its electrical configuration.

BRIEF DESCRIPTION OF THE DRAWINGS

The various aspects and advantages of the invention will become even clearer through the following description of the architecture and the functioning of a system of the invention, according to an embodiment thereof, and by referring to the annexed drawings, wherein the invention has been applied to the case of a three-phase motor.

DETAILED DESCRIPTION OF THE PREFERRED EMBODIMENTS

Figure 1A:
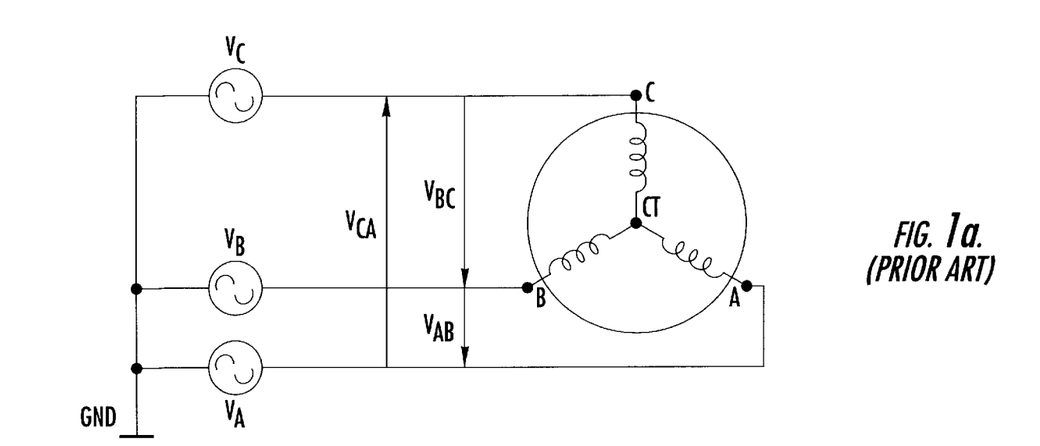
FIG. 1a represents a three-phase motor connected in a star configuration driven by Va, Vb, Vc, Vline voltages as in the prior art. In the same figure are also represented the differential phase-phase voltages (Vca, Vcb, Vba).
Figure 1B:
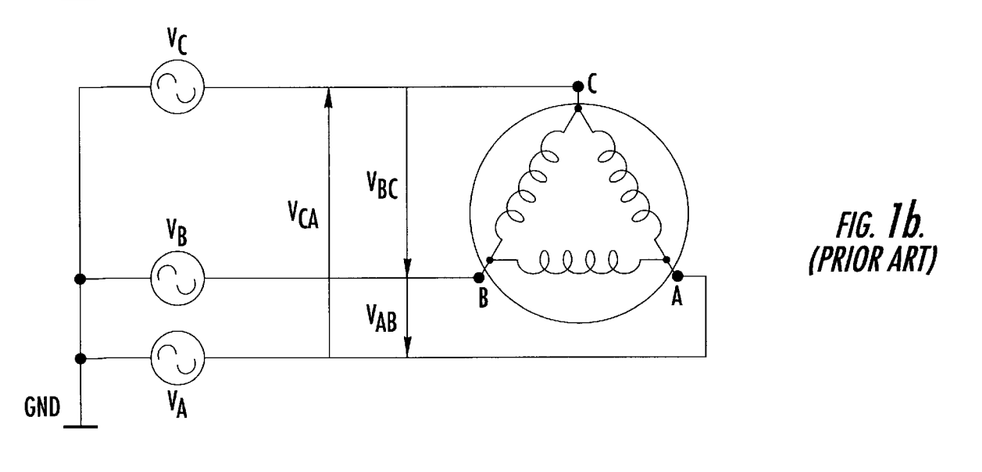
FIG. 1b represents a three-phase motor connected in a delta configuration driven by Va, Vb, Vc, Vline voltages as in the prior art. In the same figure are also represented the differential phase-phase voltages (Vca, Vcb, Vba).
Figure 2:
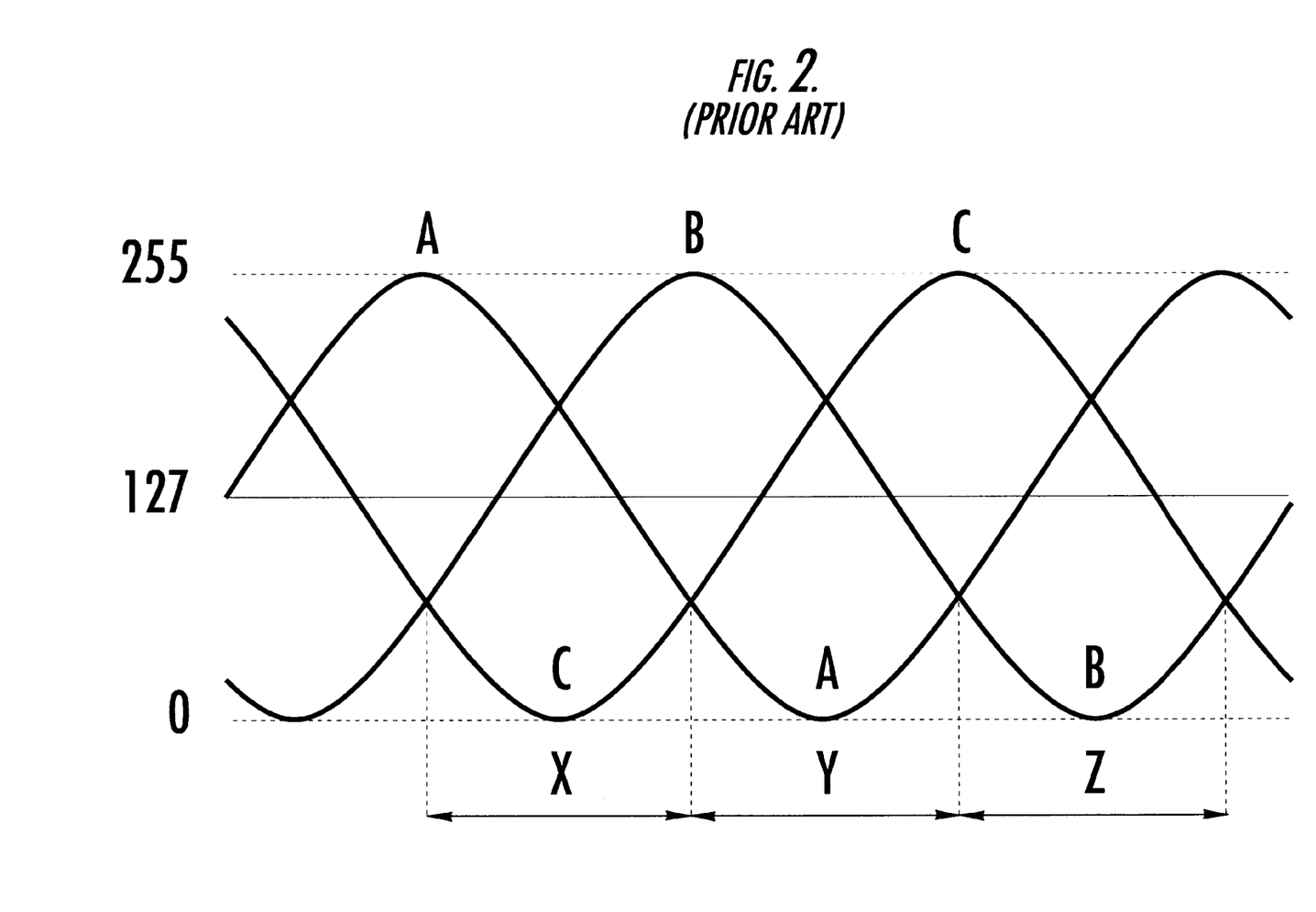
FIG. 2 represents the three sinusoidal line voltage profiles (the line voltage being referred to ground) that are cyclically applied to the three-phase windings of a brushless motor according to the driving method described in the prior art patent application No. 96830295.0.

FIG. 2 depicts the voltage profiles that are cyclically applied to the three phase windings (A, B, C), for example, according to the driving system illustrated in the prior patent application No. 96830295.0 assigned to the present assignee. To simplify the description, reference is made to sinusoidal drive profiles, although the ensuing considerations also apply for the most general case of profiles resulting from a Fourier sum of harmonics of a fundamental phase switching frequency. The three digitized profiles are numerically represented by samples whose value is expressed in the form of an 8-bit word. The zero voltage being equivalent to the number 127, while the positive peak value and the negative peak value correspond respectively to 255 and 0.

The figure also shows the intervals (X-Y-Z) whose duration is equal to 120 electrical degrees, during which one of the three profiles is lower than the other two. At any instant it is possible to identify one phase winding on which there exist a voltage lower than the voltage present on the other two. Precisely, according to FIG. 2, the phases with a lower voltage during the intervals X, Y, Z (each of a duration equal to 120 electrical degrees), are respectively the C, A and B phases.

According to a fundamental aspect of the present invention, during any switching phase, cyclically at least one winding will be in a completely low or high saturation state, while to the other N−1 windings certain recalculated voltage profiles capable of efficiently driving the motor are applied. In the illustrated example, which refers to the case of a three-phase brushless motor, during the X interval the phase winding in a stable saturation state will be the C winding. During the Y interval the A winding will be in the saturation state, and during the Z interval the B winding will be in the saturation state.

In the case of a three-phase motor and assuming effectively driving the phase windings with a sinusoidal waveform, (f(t)=sin(t)), the congruently modified voltage profile that must be applied to the terminals of two excited phase windings (that is between a terminal of the winding and ground) according to a PWM mode control, is adequately recalculated, according to the following expressions:

Interval X:C'=φ; B'=sin (B)−sin (C); A'=sin (A)−sin (C)  (1)

Interval Y:A'=φ; B'=sin (B)−sin (A); C'=sin (C)−sin (A)  (2)

Interval Z:B'=φ; A'=sin (A)−sin (B); C'=sin (C)−sin (B)  (3)

In considering the case of a three-phase brushless motor and a sinusoidal type of effective driving (FIG. 2), it may be noticed that there exist three intervals wherein one of voltages is lower than the other two. Of course, with a different number of motor phases and/or driving profiles, there will be a different number of intervals during which one or more phases windings have a voltage lower than all the others. Because the drive voltage profiles preferably should be stored in a memory, it is necessary to convert them into sequences of digital numerical samples (bytes, if an 8-bit memory is employed, as in the example considered) by scaling them by a factor $2^{n-1}$ where n is the number of bits of the data to be stored in the memory.

Figure 3A:
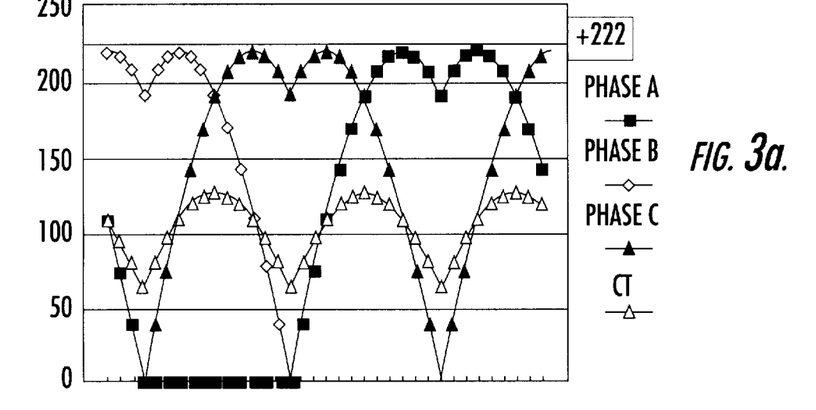
FIG. 3a represents three voltage line profiles (the voltage being referred to ground) that are cyclically applied to the three-phase windings of a brushless motor driven according to the present invention, maintaining in a low saturation state one of the three windings.

Of course, the number of samples to digitize the voltage profile is arbitrary. FIG. 3a refers to a three-phase sinusoidal driving system and graphically represents the modified profiles, according to the present invention, in terms of their digital numerical value (byte). It is evident that there always exists a low saturation (0) phase that switches every 120 electrical degrees according to the sequence C-A-B. It should be emphasized that all three phases windings assume periodically such a low saturation state (0) though only one of them is in that state at any instant.

By cyclically applying these modified profiles to the terminals of the star-configured windings of a three phase brushless motor which is a balanced system, the CT voltage profile, rather than remaining at a constant level (Vcc/2) as in the case of a conventional sinusoidal driving system of all three windings as described in the patent application No. 96830295.0, is modulated according to the waveform depicted in FIG. 3a. The waveform of the node CT, in a balanced star configured three-phase system corresponds to a third of the sum of the three voltages being applied to the three terminals of the windings of the motor. By virtue of such a CT voltage modulation, despite each of the three phase windings being cyclically kept in a fixed saturation state for 120 electrical degrees, all three motor windings (that is, between the winding terminal and the node CT) there will always be three sinusoidal voltage profiles, out-of-phase from each other by 120 electrical degrees.

Figure 3B:
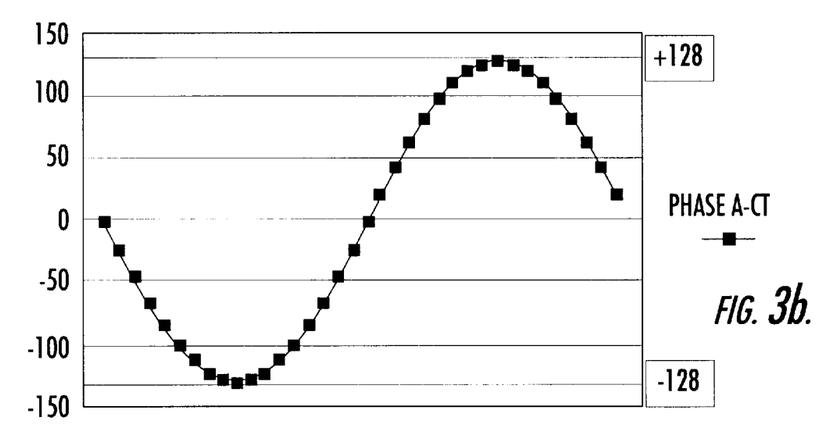
FIG. 3b shows the sinusoidal waveform of the voltage on the terminal of the motor phase winding A deriving from the difference between the voltage that is being applied to this winding and the node CT, when applying the profiles of FIGS. 3a, 3b, and 3c to the three-phase windings of the motor connected in star configuration.
Figure 3C:
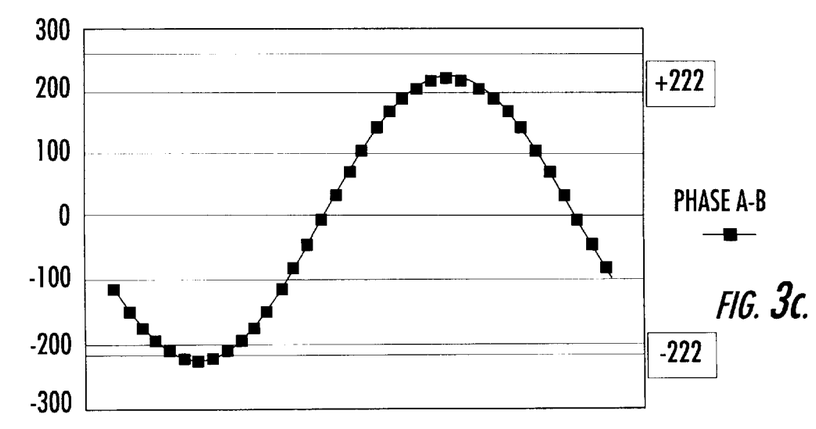
FIG. 3c shows the differential voltage between the terminals A and B deriving from the difference between the voltage that is being applied to the winding A and the winding B, when applying the profile of the FIG. 3a to the three-phase windings of the motor.

What is shown in FIG. 3b, in relation to the voltage difference between the phase terminal A and the node CT, is also true for the voltage difference between the phase B and the node CT, and for the voltage difference between C and CT. Also the differential voltages between the motor's three terminals (phase-phase) are sinusoidal and these three sinusoidal profiles are also out of phase from each other by 120 electrical degrees, as shown in FIG. 3c.

Therefore, considering star configured windings, the resulting voltage swing on the single phase winding is equal to 256 (±128) (FIG. 3b). This digitally expressed dynamic range, when converted to an analog form by way of a Byte-to-PWM converter and applied to a half bridge output stage functioning with a power supply of 12V, equates to a dynamic range of ±6V. This is equal to what is obtained with the driving system defined in the prior patent application No. 96830295.0. However, while in the known system such a dynamic range is obtained by way of three digital profiles ranging from 0 to 255, according to the method of the present invention the same dynamic range is obtained with digital profiles from 0 to 222 (FIG. 3a), based upon considering the profiles stored in 8-bit registers.

Hence, by scaling with a factor of about 1.14=255/222 the digital profiles of the present invention it is possible to exploit the whole available dynamic range (0 to 255). This permits obtaining the equivalent difference between the digital profile applied to a phase winding terminal and the node CT to be equal to ±146. Conversion of this digital value into the equivalent analog voltage value gives ±6.84V, with the same supply voltage of 12V. This is obtained because with the new profiles defined according to the present invention, the node CT does not remain fixed at a certain potential, but its potential is modulated, as previously illustrated.

Figure 4A:
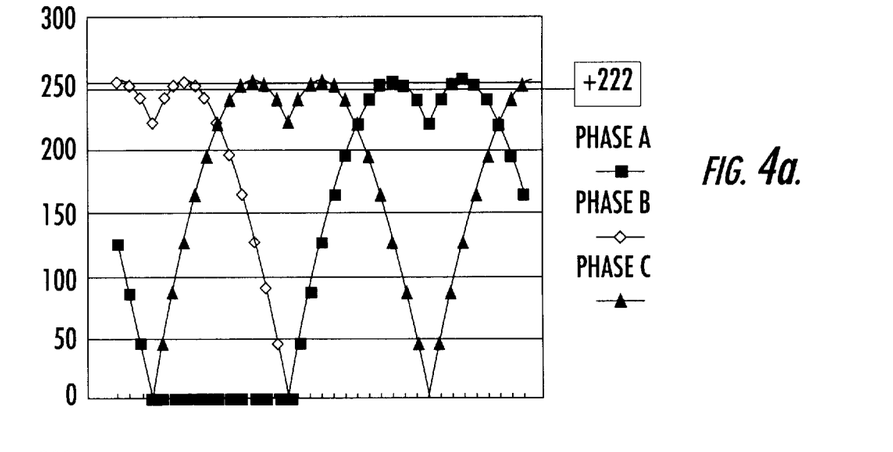
FIGS. 4a, 4b and 4c represent the voltage profiles of FIG. 3a, scaled by a factor =1.14 in order to fully exploit the available dynamic range, from 0 to 255, when using 8-bit memory registers.
Figure 4B:
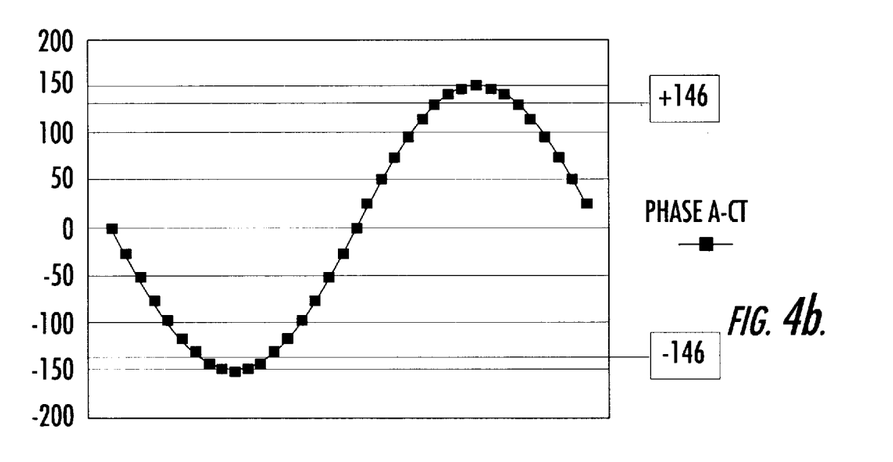
Figure 4C:
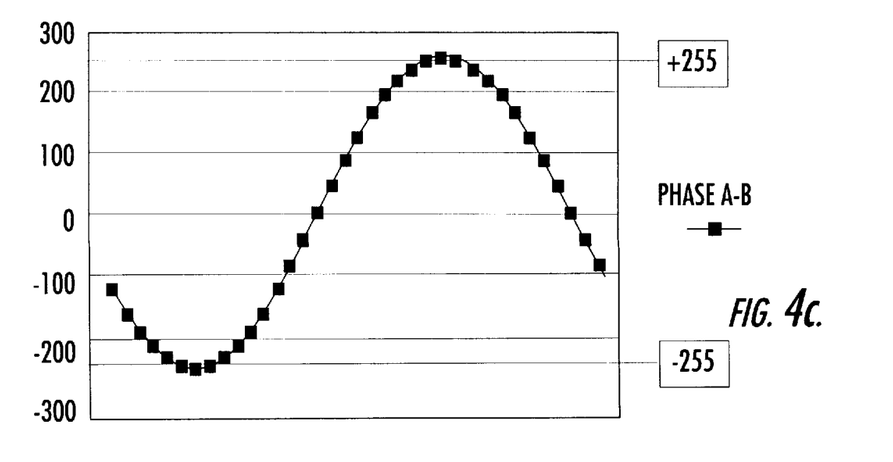

FIGS. 4a and 4b represent graphically what has just been described. The new profiles are stored exploiting the entire 0 to 255 dynamic range as allowed by the 8-bits memory registers used in the example shown. Thus the stored profile corresponds to the maximum voltage swing applicable to the phase windings.

What is explained above is referred to a three phase star configured motor but it is applicable to any other motor. Indeed, the new voltage profile provides the best or preferred approach also regarding the differential voltage swing. In fact the differential (phase-phase) voltage swing is equal to ±6* √3 V using the approach defined in the prior patent application No. 96830295.0, while it becomes equal to ±12 V according to the present invention. Of course, should the voltages be modulated to control the speed of the motor, it will be necessary to scale down the voltages by a certain Kval factor. This may be done, for example, by way of a digital multiplier before feeding the so scaled digital values to the Byte-to-PWM converters.

Figure 5A:
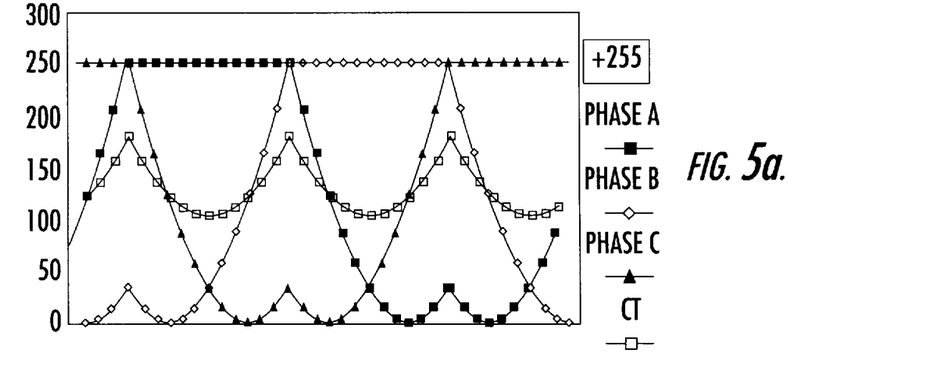
FIGS. 5a and 5b represent the three voltage profiles that are cyclically applied to the three-phase windings of a brushless motor according to the present invention, for maintaining in a high saturation condition one of the three windings and the sinusoidal shape of the voltage waveform on the terminal of the phase windings A of the motor deriving from the difference between the voltage being applied to this winding and the node CT of the motor when applying the three profiles.
Figure 5B:
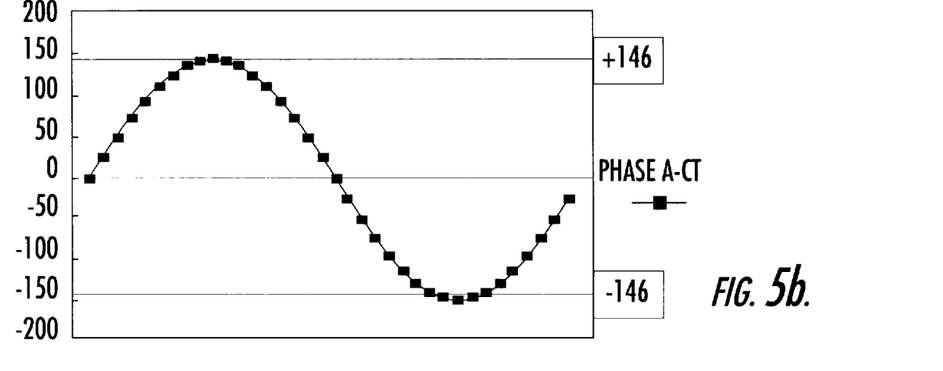
Figure 5C:
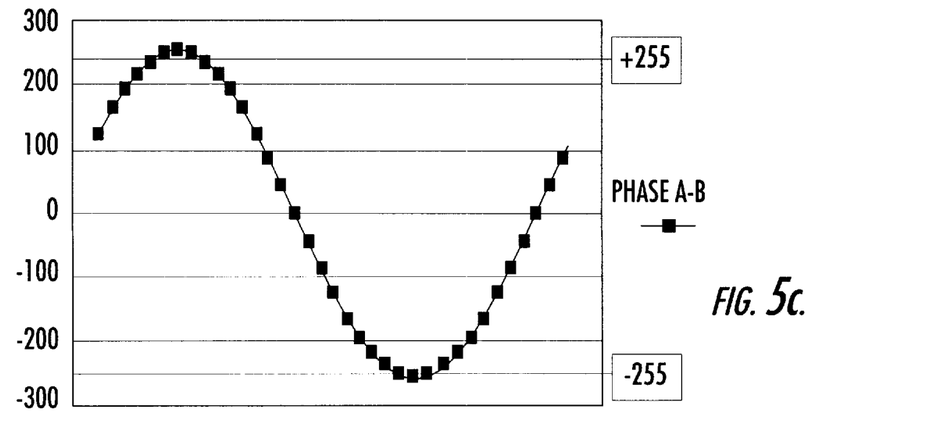
FIG. 5c shows the differential voltage between the terminals A and B deriving from the difference between the voltage that is being applied to the winding A and the winding B when applying the profiles of FIG. 5a to the three-phase windings of the motor.

What has been described above for the case in which one of the three-phases must be kept in a low saturation state (0) during the respective intervals, each of 120°, is also perfectly applicable to the case in which one of the three-phases must be kept in a high saturation state (255). Of course, this state of saturation will be imposed to the phase winding that in the relative interval has the highest voltage as compared to the other two phase windings. This alternative embodiment of the method of the invention is graphically shown in FIGS. 5a, 5b and 5c in which the profiles are shown already scaled down to obtain the above discussed increment of dynamics.

The choice of either a low or high fixed saturation profile may depend on whether in the first case the current circulates for a longer period of time in the low-side device of the relative half-bridge power stage, or whether in the second case the current circulates for a longer period of time in the high-side device. Therefore, it is possible to choose which devices of the driving half-bridges should work more heavily. For example, if the half-bridges are integrated with a Pmos and Nmos pair (where the Pmos is the high-side device and Nmos is the low-side device), for the same silicon area of integration the Pmos device has a Rdson greater than the Nmos device. Thus, by selecting a low fixed saturation profile, the low-side device made by a lower channel resistance Nmos of the half-bridge will work more. This will reduce the net power dissipated in the integrated circuit, since the power dissipated will be dependent on the MOS transistor resistance and by the square of the current.

Figure 6:
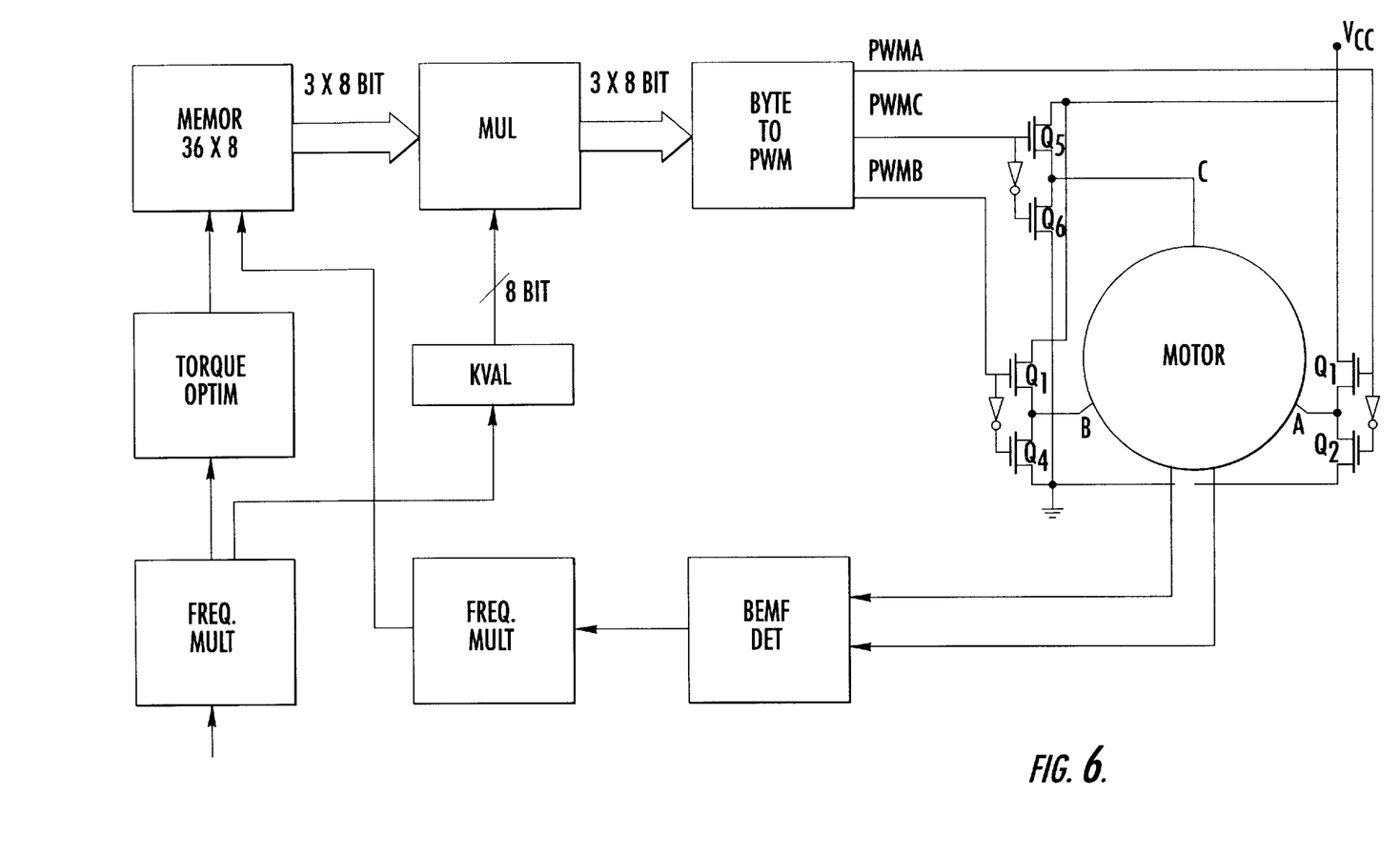
FIG. 6 is an example of block diagram of the system of the invention.

FIG. 6 shows an example a complete block diagram of a driving system of a brushless motor implementing the present invention. The block MEMOR represents a memory (RAM, ROM, EPROM, . . . ) in which are stored the samples of the digital profiles, according to the method of the present invention. The block MUL represents a digital multiplier that provides for the scaling down by a factor contained in the register Kval of each of the three samples (bytes) read from the memory.

The block BYTE-to-PWM performs a PWM conversion of the three samples, suitably scaled by the preceding block. The three output PWM signals of this block are fed to the inputs of the three half-bridge stages composed of the power BJT or MOS (Q1, . . . , Q6), which provide for the necessary power gain. Each output node of the three half-bridges is connected to the terminal of a respective phase winding of the driven brushless motor.

During a switching phase, one of the three digital values at the input of the converter block will be equal to "φ" and the corresponding PWM output signal will have a duty cycle of 0%, implementing a state of low saturation of the respective half-bridge. Alternatively, during a switching phase one of the three digital values at the input of the converter block will be equal to "255" and the corresponding PWM output signal will have a 100% duty cycle, implementing a state of high saturation of the respective half-bridge.

The block BEMF DET detects the rotor's instantaneous position allowing for a correct synchronization between the switchings of the voltage applied to the three-phases with the position of the rotor. The block FREQ MUL multiplies the frequency originating from the BEMF DET block by a factor equal to the number of samples with which the voltage profile contained in the memory is digitized. Such a multiplied frequency is used as the clock for scanning the memory registers.

The register TORQUE OPTIM contains the starting address from which the scanning of the profile stored in the memory must start at the next zero-cross assertion of the back electromotive force (BEMF). The content of the TORQUE OPTIM and Kval registers may be loaded through a serial port, as schematically illustrated in the figure by the block SERIAL PORT.

The system herein described is based on the fact that, when opting to effectively drive the windings with sinusoidal voltage profiles, every 120 electrical degrees one of the three phase windings is alternatively biased in either a low or a high saturation state. This means that if from the memory scan comes a sample sequence corresponding to a portion of the recalculated cyclic profile corresponding to a low or high saturation in the half-bridge that controls the particular phase winding, the low-side or high-side transistor is kept ON (for a low or a high saturation, respectively). The complementary transistor of the same half-bridge is kept OFF. If high, the profile portion will have samples of a constant "255" value, whereas, if low, the profile portion will have samples of a constant "φ" value, for the case of an 8-bit memory. Simultaneously, the other two half bridges switch at the PWM frequency, with a duty-cycle that corresponds to the value of the samples sequentially read from the memory after scaling them by the Kval factor.

For the case of a fixed state of low saturation: when phase A is in the state of saturation, the transistor Q2 is kept ON and Q1 is OFF, while Q3, Q4, Q5 and Q6 continuously switch between 0 and Vcc. When phase B is in the state of saturation, the transistor Q4 is kept ON and Q3 is OFF, while Q1, Q2, Q5 and Q6 continuously switch between 0 and Vcc. And when phase C is in the state of saturation, the transistor Q6 is kept ON and Q5 is OFF, while Q1, Q2, Q3 and Q4 continuously switch between 0 and Vcc.

That which is claimed is:

1. A method of driving a multiphase brushless motor with N windings according to a first periodic voltage profile intended as a voltage present on each winding, the method comprising the steps of:

cyclically keeping for a predetermined time interval at least one of the N windings in a fixed state of low or high saturation; and while applying to the other phase windings instantaneous voltages according to second respective periodic voltage profiles different from the first periodic voltage profile so that a voltage actually present on each of said N windings has a value coherent with the first periodic voltage profile.

2. A method according to claim 1, wherein a number of intervals in an entire electrical period in which the fixed state of low or high saturation of at least one winding is produced, depends on the second periodic voltage profiles and upon the number N of windings.

3. A method according to claim 1, further comprising the step of keeping at any instant at least one of N half-bridge stages in a fixed saturation state, low or high, while other half bridge stages switch at a PWM frequency with a duty-cycle varying as a function of a predetermined scaling of digital samples of the second periodic voltage profiles.

4. A method according to claim 1, wherein the N windings are connected in a star configuration.

5. A method according to claim 1, wherein the N windings are connected in a polygonal configuration.

6. A method according to claim 1, wherein the first periodic voltage profile is sinusoidal.

7. A method according to claim 1, further comprising the steps of:

digitizing the second periodic voltage profiles with a number of samples stored in a memory; and converting a modulated digital value into a duty cycle percentage value of a PWM driving signal.

8. A method of driving a multiphase brushless motor with N windings using N half-bridge stages according to a first periodic voltage profile intended as a voltage present on each winding, the method comprising the steps of:

cyclically keeping for a predetermined time interval at least one of the N half-bridge stages in a fixed state so that the corresponding winding is in a fixed low or high saturation state; and while applying to the other phase windings instantaneous voltages from the other half-bridge stages based upon pulse width modulation according to second respective periodic voltage profiles different from the first periodic voltage profile so that a voltage actually present on each of said N windings has a value coherent with the first periodic voltage profile.

9. A method according to claim 8, wherein a number of intervals in an entire electrical period in which the fixed state of low or high saturation of at least one winding is produced, depends on the second periodic voltage profiles and upon the number N of windings.

10. A method according to claim 8, wherein the step of applying to the other phase windings instantaneous voltages is performed based on a PWM frequency with a duty-cycle varying as a function of a predetermined scaling of digital samples of the second periodic voltage profile.

11. A method according to claim 8, wherein said N windings are connected in a star configuration.

12. A method according to claim 8, wherein the N windings are connected in a polygonal configuration.

13. A method according to claim 8, wherein the first periodic voltage profile is sinusoidal.

14. A method according to claim 8, further comprising the steps of:

digitizing the second periodic voltage profiles with a number of samples stored in a memory; and converting a modulated digital value into a duty cycle percentage value of a PWM driving signal.

15. A method according to claim 8, wherein said plurality of half-bridge stages are configured for N windings connected in a star configuration.

16. A method according to claim 8, wherein said plurality of half bridge stages are configured for N windings connected in a polygonal configuration.

17. An apparatus for driving a multiphase brushless motor comprising N windings, the apparatus comprising:

a plurality of half-bridge stages connected to the N windings;

a memory for storing driving signal profiles;

a multiplier for multiplying the driving signal profile values from said memory by a scale factor; and a control circuit for generating pulse width modulated control signals to predetermined ones of said half-bridge stages based upon the scaled driving signal profile values and while causing a low or high saturation state in the respective half-bridge stage for at least one of the N windings.

18. An apparatus according to claim 17, further comprising a back electromotive force (BEMF) detector to be coupled to the motor.

19. An apparatus according to claim 18, further comprising a frequency multiplier connected between the BEMF detector and said memory for controlling addressing thereof.

20. An apparatus according to claim 18, further comprising a register for containing a starting address from which scanning of a profile stored in said memory starts at a next zero-cross detection.

* * * * *

UNITED STATES PATENT AND TRADEMARK OFFICE
CERTIFICATE OF CORRECTION

PATENT NO. : 6,137,253
DATED : October 24, 2000
INVENTOR(S) : Ezio Galbiati, Michele Boscolo, Marco Viti It is certified that error appears in the above-identified patent and that said Letters Patent is hereby corrected as shown below:

Drawings, Fig. 4a Insert:

Drawings, Fig. 6 Insert:

UNITED STATES PATENT AND TRADEMARK OFFICE
CERTIFICATE OF CORRECTION

PATENT NO. : 6,137,253
DATED : October 24, 2000
INVENTOR(S) : Ezio Galbiati, Michele Boscolo, Marco Viti It is certified that error appears in the above-identified patent and that said Letters Patent is hereby corrected as shown below:

Column 3:
Line 29, delete "=" insert --≅--

Column 4:
Line 32, insert --the-- after "of"

Signed and Sealed this

Seventh Day of August, 2001

*Attest:*

*Attesting Officer*

NICHOLAS P. GODICI
*Acting Director of the United States Patent and Trademark Office*